(12) United States Patent
Tomaj

(10) Patent No.: US 9,352,717 B2
(45) Date of Patent: May 31, 2016

(54) COMPOSITE LAYER

(71) Applicant: MAGNA INTERIORS (EUROPE) GMBH, Munich (DE)

(72) Inventor: Anton Tomaj, Esslingen (DE)

(73) Assignee: MAGNA INTERIORS (EUROPE) GMBH, Munich (DE)

( * ) Notice: Subject to any disclaimer, the term of this patent is extended or adjusted under 35 U.S.C. 154(b) by 0 days.

(21) Appl. No.: 14/001,270

(22) PCT Filed: Nov. 27, 2012

(86) PCT No.: PCT/DE2012/200078
§ 371 (c)(1),
(2) Date: Aug. 23, 2013

(87) PCT Pub. No.: WO2013/091628
PCT Pub. Date: Jun. 27, 2013

(65) Prior Publication Data
US 2015/0298640 A1    Oct. 22, 2015

(30) Foreign Application Priority Data
Dec. 19, 2011   (DE) .......................... 10 2011 121 378

(51) Int. Cl.
| | | |
|---|---|---|
| *B60R 21/2165* | (2011.01) | |
| *B32B 7/14* | (2006.01) | |
| *B32B 5/02* | (2006.01) | |
| *B32B 9/02* | (2006.01) | |
| *B32B 9/04* | (2006.01) | |
| *B32B 5/18* | (2006.01) | |
| *B32B 37/12* | (2006.01) | |

(52) U.S. Cl.
CPC ............ *B60R 21/2165* (2013.01); *B32B 5/024* (2013.01); *B32B 5/026* (2013.01); *B32B 5/18* (2013.01); *B32B 7/14* (2013.01); *B32B 9/025* (2013.01); *B32B 9/046* (2013.01); *B32B 9/047* (2013.01); *B32B 37/12* (2013.01); *B32B 2307/582* (2013.01); *B32B 2605/003* (2013.01); *B32B 2605/08* (2013.01)

(58) Field of Classification Search
CPC ...... B60R 21/2165; B32B 5/024; B32B 5/026
USPC .......................................................... 428/43
See application file for complete search history.

(56) References Cited

U.S. PATENT DOCUMENTS

2002/0050046 A1   5/2002   Nicholas
2010/0194082 A1   8/2010   Totani et al.

FOREIGN PATENT DOCUMENTS

| | | | | |
|---|---|---|---|---|
| CN | 101415587 A | | 4/2009 | |
| DE | 202006005319 | * | 6/2006 | ............ B60R 21/201 |
| DE | 202006005319 U1 | | 6/2006 | |
| DE | 102006025666 A1 | | 12/2007 | |
| DE | 102006054586 | * | 1/2008 | ........... B23K 26/385 |
| DE | 102006054586 B3 | | 1/2008 | |

(Continued)

*Primary Examiner* — Brent O'Hern
(74) *Attorney, Agent, or Firm* — Banner & Witcoff, Ltd.

(57) ABSTRACT

A composite layer for covering an automotive airbag, which includes a carrier layer and a decorative layer which are connected to one another via an adhesive, and a default tear line in a designated area, the default tear line having a material weakening which is implemented at least in sections in the carrier layer and/or the decorative layer, and no adhesive is located between the carrier layer and the decorative layer in at least one section of the default tear line.

17 Claims, 4 Drawing Sheets

(56) References Cited

FOREIGN PATENT DOCUMENTS

| | | |
|---|---|---|
| DE | 102009032580 A1 | 3/2011 |
| JP | 2009255914 A | 11/2009 |
| JP | 2010173505 A | 8/2010 |

* cited by examiner

COMPOSITE LAYER

CROSS-REFERENCE TO RELATED APPLICATIONS

The present application is a National Stage Application of PCT International Application No. PCT/DE2012/200078 (filed on Nov. 27, 2012), under 35 U.S.C. §371, which claims priority to German Patent Application No. DE 10 2011 121 378.7 (filed on Dec. 19, 2011), which are each hereby incorporated by reference in their complete respective entireties.

TECHNICAL FIELD

Embodiments of the invention relate to a composite layer for covering an airbag and includes a carrier layer and a decorative layer which are connected with one another by way of an adhesive.

BACKGROUND

Composite layers for covering an airbag, which is located in a compartment, have material weakenings which are introduced during manufacturing. These material weakenings, in the shape of a line, enable the material to be torn by the airbag which inflates when triggered. A defined tearing of the composite layer is necessary in order for the airbag to unfold in the manner intended for providing personal safety. The tear line, the material weakening should not be visible from the decorative side.

SUMMARY

The task of the present invention is to achieve a composite layer of an improved configuration with which a defined tearing is enabled in a safe manner and which is, in particular, easy to manufacture at reasonable cost.

This task is solved by a composite layer for covering an automotive airbag, which includes a carrier layer and a decorative layer which are connected to one another via an adhesive, and a default tear line in a designated area, the default tear line having a material weakening which is implemented at least in sections in the carrier layer and/or the decorative layer, and no adhesive is located between the carrier layer and the decorative layer in at least one section of the default tear line.

In accordance with embodiments of the invention, a composite layer includes a carrier layer and a decorative layer which are connected via an adhesive, and a default tear line in a designated area, along which line the airbag, which is located under the decorative layer in a compartment, when triggered causes a tearing of the composite layer, the default tear line having a material weakening which is implemented at least in sections of the carrier layer and/or the decorative layer, and no adhesive is located between the carrier layer and the decorative layer in at least one section of the default tear line, the layers thus not being glued together in one section along the gluing line.

In a first embodiment of the invention, only the decorative layer has a linear material weakening which is incorporated on the underside of said layer. In a designated region of the tear line, the carrier layer and the decorative layer are not glued to one another. As a result of this adhesive-free region, the decorative layer remains soft and is able to tear easily and transfer an induced tear in a designated direction.

In accordance with a further embodiment of the invention, the carrier layer has a material weakening in the shape and arrangement required for the designated default tear region. The decorative layer which is applied to the carrier layer has a material weakening which, in sections, coincides with the material weakening of the carrier layer. In other regions, the material weakening in the decorative layer is absent where the carrier layer has a material weakening. In order for the default tear line not be visible, or to be as inconspicuous as possible, respectively, when seen from the decorative side, only short sections are weakened on the underside of the decorative layer, i.e., the side on which the decorative layer is glued to the carrier layer, which short sections then come to lie over the weakening sections present in the carrier layer in the composite product. In addition, it is, after all, provided in accordance with the invention that the adhesive layer has interruptions in sections of the default tear line, such that the carrier layer and the decorative layer are not glued together in these designated sections of the default tear line.

Embodiments of the invention exploit the principle according to which it is sufficient for the material weakening in the decorative layer, the underside of the decorative layer, to be present only in the shape of so-called initial incisions. In conjunction with the adhesive-free section between the layers, a clean tearing of the composite layer substantially along a designated tear line is achieved.

As a result of the material weakening which is, in relation to the length of the default tear line, continuously incorporated in the carrier layer which is located under the decorative layer, the airbag which inflates after being triggered and the airbag cover cause a defined tearing of the composite layer. The material weakening in the carrier layer, the omitted section within the adhesive layer between decorative layer and carrier layer, and the initial incisions in the decorative layer together result overall in a clean bursting, tearing-open of the composite layer.

The method in accordance with the invention for manufacturing the composite layer is based on a carrier layer and a decorative layer, for example, a layer of leather, which is to be applied to the carrier layer. In the case of the carrier layer, this may be a batt, a knitted fabric, a woven fabric, a foamed body. On the reverse side of the decorative layer, a material weakening is incorporated along the tear line, the line along which the composite layer is to tear open upon triggering of the airbag. This is realized in the shape of an incision by means of a cutting wheel or by means of a laser. The material of the decorative layer is not completely severed in this instance; the incision far rather reaches only to such a depth that a significantly reduced strength of the layer is achieved, but at the same time not rendering this type of weakening evident on the visible side.

Thereafter, an adhesive is applied to, sprayed onto the reverse side of the decorative material and/or the top side of the carrier material. In this instance a stripe-shaped section of the tear line is omitted, i.e. no application of adhesive occurs in this stripe. The omission of the application of adhesive occurs, for example, by placing a template on the top side of the carrier layer, the underside of the decorative layer.

After the adhesive has dried, the decorative layer is placed with its underside on the carrier layer with an accurate fit. The adhesive components are activated by heating, in the course of which the layers are pressed onto one another. The two layers are now glued to one another along the tear line, except for the omitted region, section.

In accordance with a further embodiment of the invention, a method includes a material weakening also incorporated in the carrier layer, preferably from the underside of the layer. The incision, which causes weakening and is applied by means of a blade or a laser, in this instance follows the desired tear line, wherein it may be provided that this weakening incision is implemented along the entire tear line or only along sections of the tear line.

The application of adhesive occurs on one or both of the layers, in each case on the top side or the underside, respectively. In order to achieve adhesive-free zones along the designated tear line, templates are placed in the case of a spray application.

DRAWINGS

The description of exemplary embodiments of the invention with reference to the drawings is presented in the following.

DESCRIPTION

Figure 1:
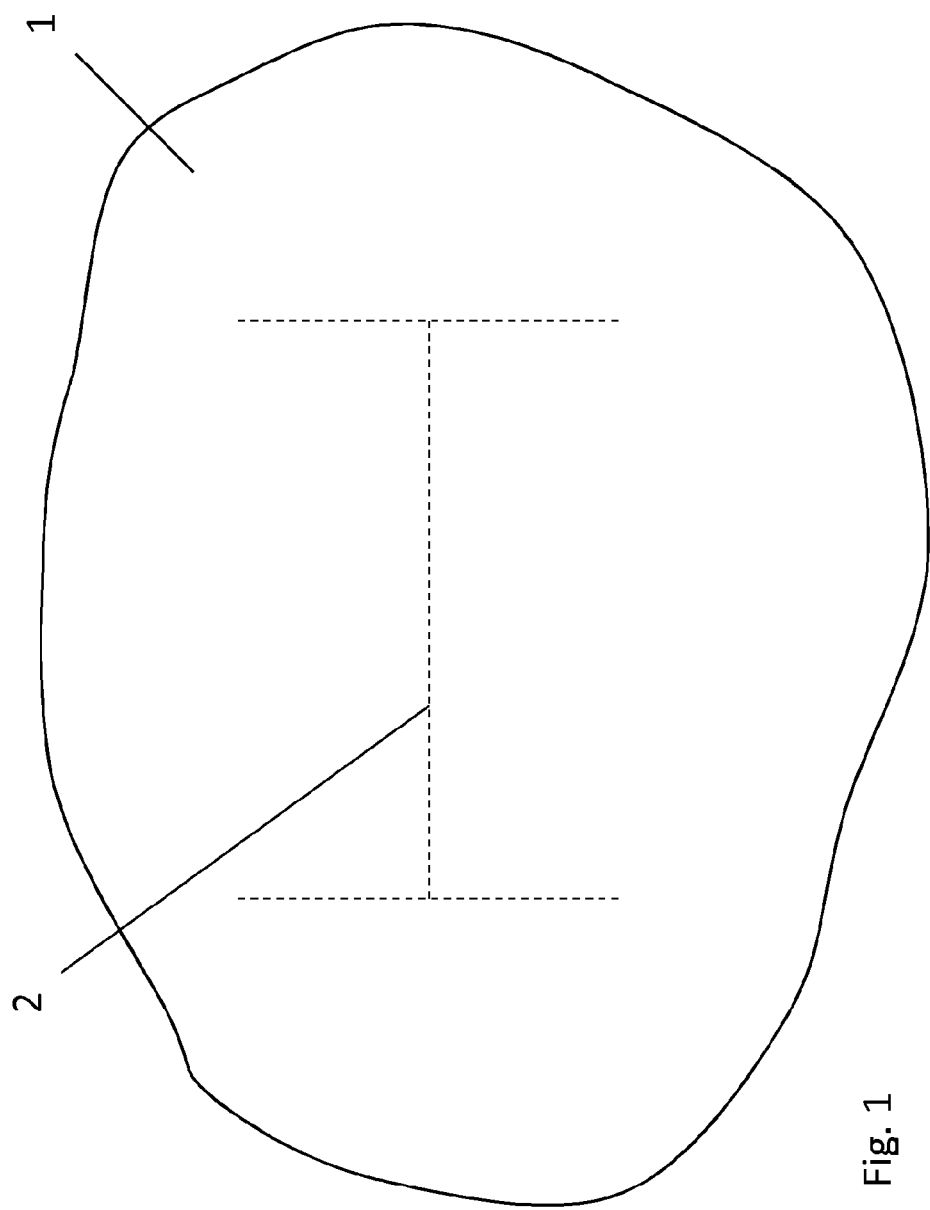
FIG. 1 illustrates a part of a composite layer in accordance with embodiments of the invention.

FIG. 1 illustrates shows, as a detail, a part of a composite layer 1, and includes an upper decorative layer 3 and a carrier layer which is located below said decorative layer, having a tear line 2 which is indicated in the shape of the dashed line. The tear line 2 is designed in the shape of an H, having a long horizontal tear line which is delimited at either side by two tear lines which extend perpendicularly to it. The airbag is stored below this detail of the composite layer 1 in a compartment under a flap. The flap, the edge of the flap extends below the horizontal section of the tear line 2. Upon triggering of the airbag, the composite layer 1 is intended to tear along the tear line 2.

Figure 2:
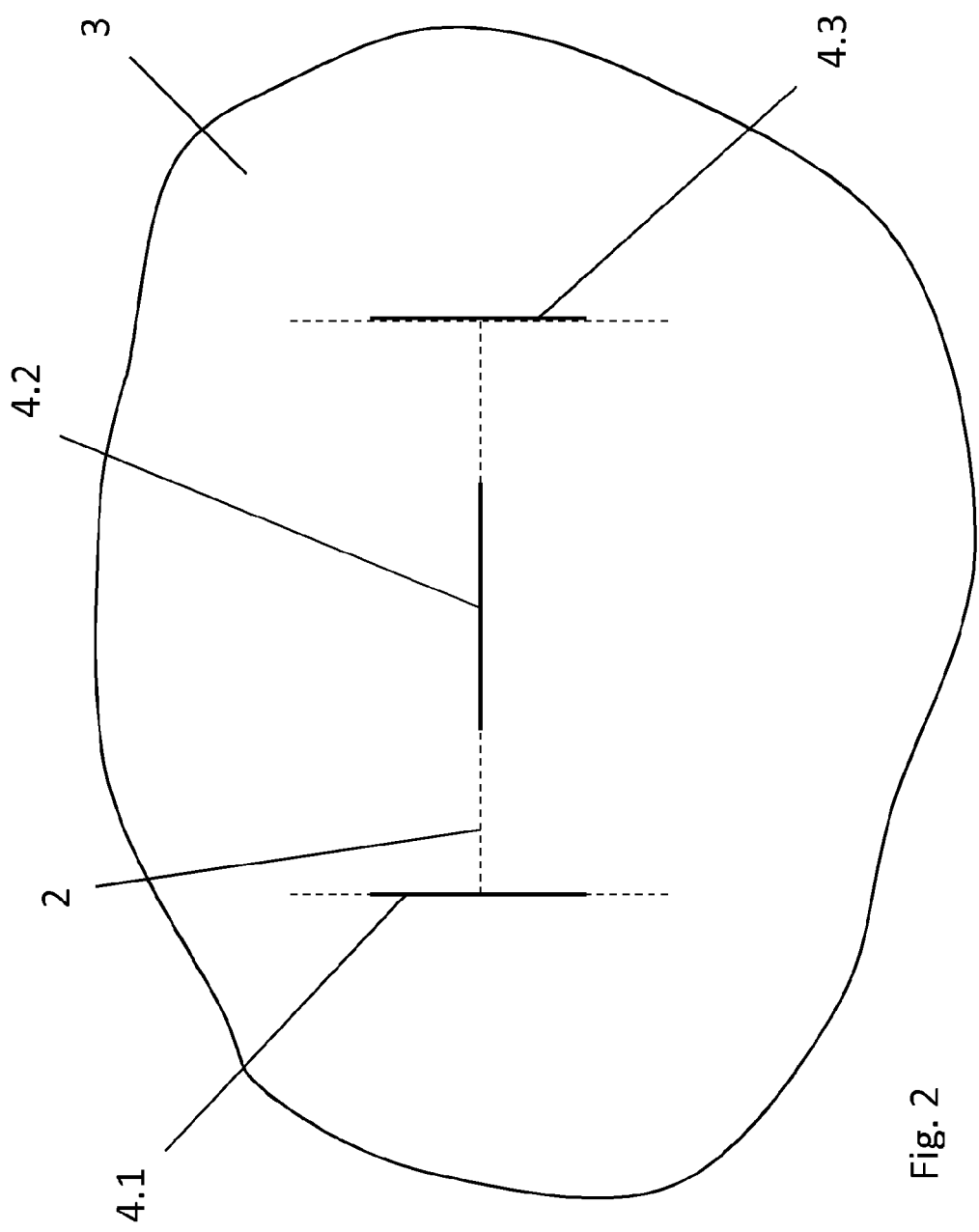
FIG. 2 illustrates a decorative layer 3 of the composite layer in accordance with embodiments of the invention.

FIG. 2 illustrates the detail of the decorative layer 3 which corresponds to that in FIG. 1, which decorative layer 3 is, for example, a type of real leather. Three initial incisions 4.1, 4.2, 4.3 are incorporated on the underside of the leather layer along the designated tear line 2. These incisions, which do not entirely penetrate the material layer and in this manner achieve the material weakening, extend perpendicularly or at an angle which is perpendicular to the material layer and are implemented by means of a tool or a laser.

As reproduced in FIG. 2, the initial incisions 4.1, 4.2, 4.3 in the decorative layer do not completely follow the designated tear line 2. The initial incision 4.2, which is oriented in the direction of the horizontal part of the tear line, does not follow the latter over its entire length but is implemented, commencing from the center, only in a shortened manner. The initial incisions 4.1, 4.3, which delimit the horizontal part of the tear line 2 and extend perpendicularly, are not affected by the central initial incision 4.2.

Figure 3:
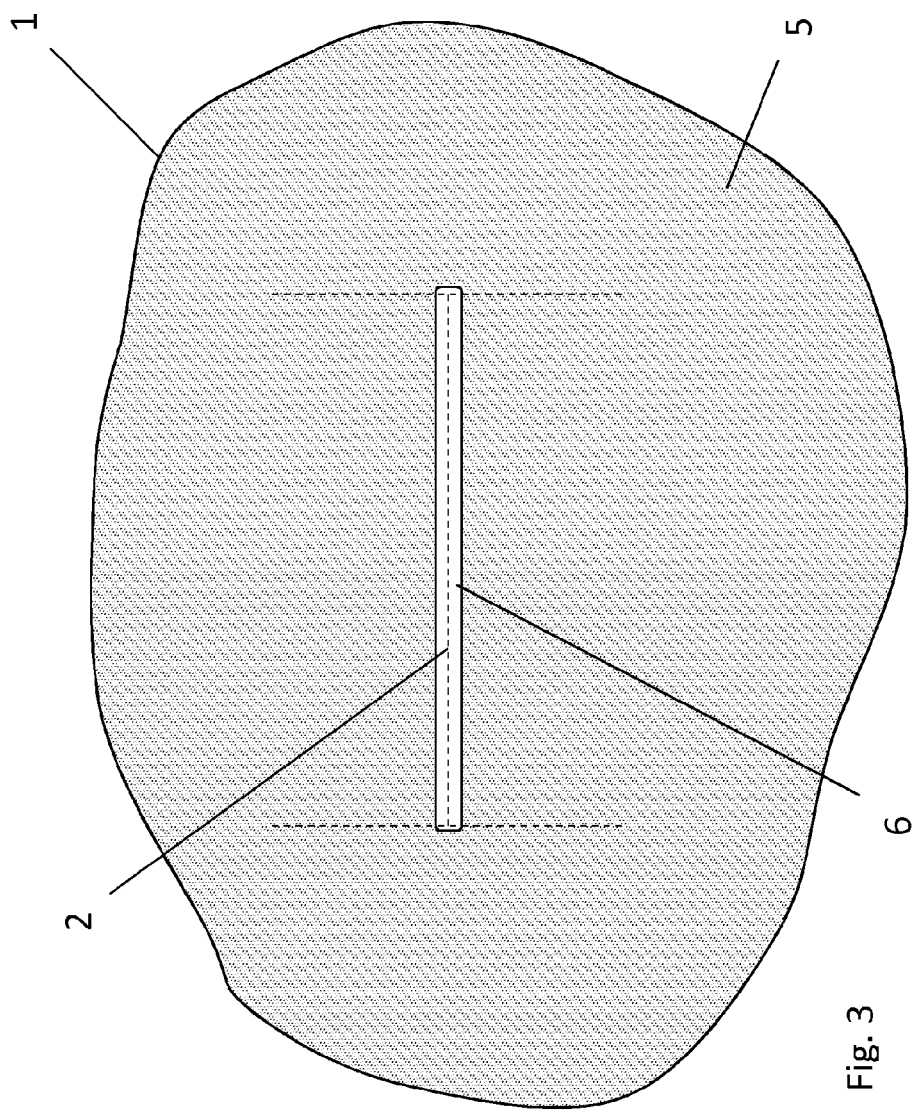
FIG. 3 illustrates an adhesive region of the composite layer in accordance with embodiments of the invention.

FIG. 3 illustrates, within the detail of the composite layer 1 of FIG. 1, the adhesive region 5, i.e., that area of the top side of the carrier layer and/or of the underside of the decorative layer 3 which is coated by the adhesive. A stripe-shaped region 6 around the horizontal section of the tear line 2 is implemented as adhesive-free. This adhesive-free region 6 extends in this instance up to the perpendicularly extending sections of the tear line 2.

Figure 4:
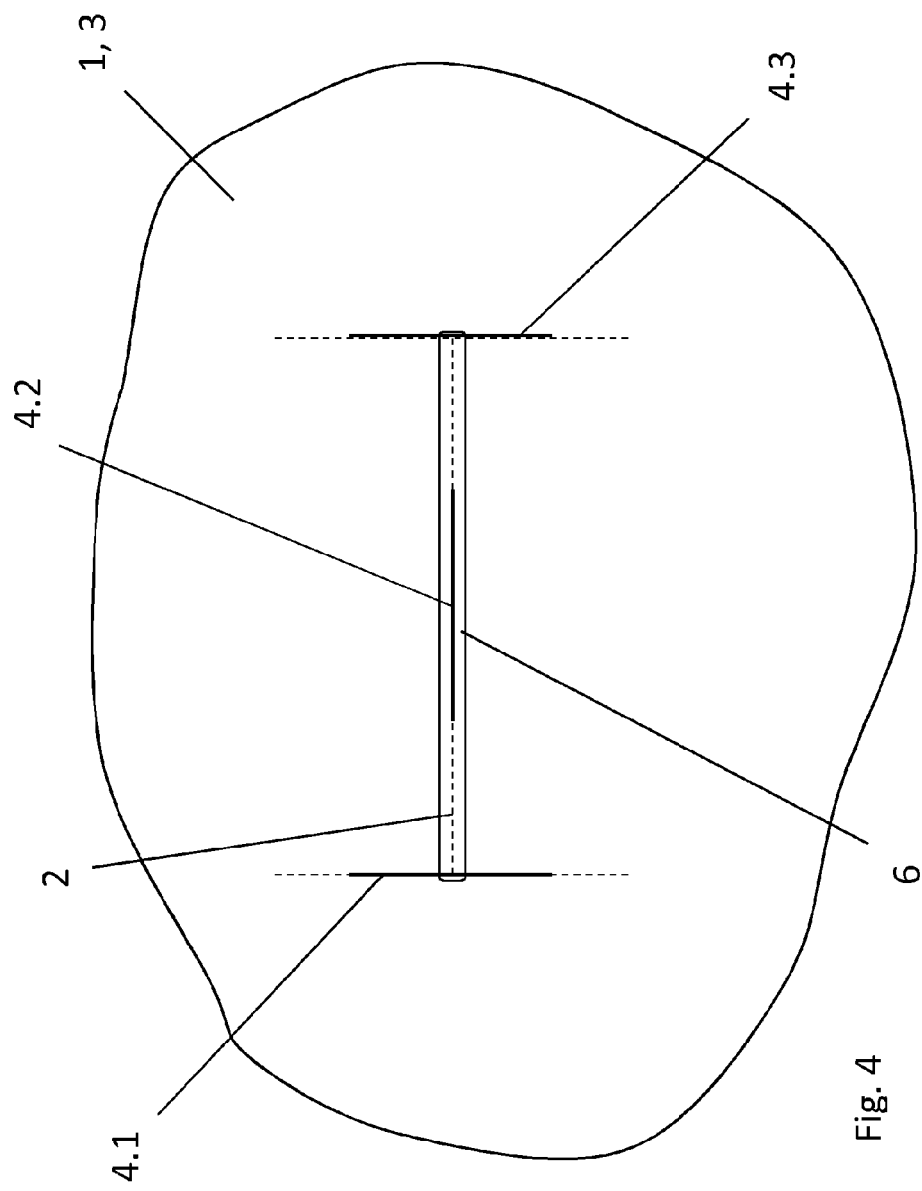
FIG. 4 illustrates initial incisions incorporated in the underside of the decorative layer of the composite layer in accordance with embodiments of the invention.

FIG. 4 illustrates a situation which results in its entirety below the decorative layer 3, in which the adhesive-free region 6 reaches the outer initial incisions 4.1, 4.3, which extend perpendicularly, and extends as a stripe on both sides of the central initial incision 4.2. The illustrated embodiment of the initial incisions 4.1, 4.2, 4.3 incorporated in the underside of the decorative layer 3, and of the adhesive-free region 6 between the decorative layer 3 and the carrier layer, results in a defined tear behavior in the event of a triggering. In this instance, the composite layer 1 will initially tear in the region of the initial incision 4.2, wherein this induced tear will, due to the absence of adhesive and the thus resulting softness of the material, run rapidly and in a defined manner up to the perpendicularly oriented initial incisions 4.1, 4.3, which will now also induce the tearing of the composite layer, specifically in a direction which is perpendicular to the first direction of tearing.

LIST OF REFERENCE SIGNS

1 Composite layer
2 Tear line, default tear line
3 Decorative layer, leather, artificial leather
4.1 Initial incision (underside of decorative layer)
4.2 Initial incision (underside of decorative layer)
4.3 Initial incision (underside of decorative layer)
5 Adhesive region
6 Adhesive-free region (Adhesive region 5)

What is claimed is:

1. A composite layer for covering an automotive airbag, comprising:
   a carrier layer; and
   a decorative layer connected to the carrier layer via an adhesive;
   a default tear line in a designated area of the composite layer, the default tear line having incisions provided at least in sections of the carrier layer and/or decorative layer, wherein the incisions do not follow the default tear line over its entire length;
   wherein no adhesive is located between the carrier layer and the decorative layer in at least one section of the default tear line;
   wherein the incisions are connected by the at least one section of the default tear line containing no adhesive to control progress of tearing along the default tear line.

2. The composite layer of claim 1, wherein the incisions are located in an underside of the decorative layer.

3. The composite layer of claim 1, wherein the incisions are provided only in sections of the designated tear line in the carrier layer and/or the decorative layer.

4. The composite layer of claim 1, wherein the default tear line has an H cross-section.

5. The composite layer of claim 1, wherein the default tear line comprises a horizontal tear line section and a vertical tear line section adjoining on both sides of the horizontal tear line section.

6. The composite layer of claim 5, wherein no adhesive is located between the carrier layer and the decorative layer in a region of the horizontal section of the default tear line.

7. The composite layer of claim 6, wherein the incisions are provided partially in the horizontal tear line section.

8. The composite layer as claimed in claim 7, wherein the decorative layer has one incision in a center section of the horizontal tear line section and in both adjoining vertical tear line sections.

9. A composite layer for covering an automotive airbag, comprising:
   a carrier layer; and
   a decorative layer connected to the carrier layer;

a default tear line in a designated area of the composite layer, the default tear line having incisions provided at least in sections of the carrier layer and/or decorative layer, wherein the incisions do not completely follow the default tear line;

wherein the carrier layer and the decorative layer are not connected to each other in at least one section of the default tear line defining at least one unconnected section;

wherein the incisions are connected by the at least one unconnected section of the default tear line to control progress of tearing along the default tear line.

10. The composite layer of claim 9, wherein the incisions are located in an underside of the decorative layer.

11. The composite layer of claim 9, wherein the incisions are provided only in sections of the designated tear line in the carrier layer and/or the decorative layer.

12. The composite layer of claim 9, wherein the default tear line has an H cross-section.

13. The composite layer of claim 9, wherein the default tear line comprises a horizontal tear line section and a vertical tear line section adjoining on both sides of the horizontal tear line section.

14. The composite layer of claim 13, wherein there is no connection between the carrier layer and the decorative layer in a region of the horizontal section of the default tear line.

15. The composite layer of claim 14, wherein the incisions are provided partially in the horizontal tear line section.

16. The composite layer as claimed in claim 15, wherein the decorative layer has one incision in a center section of the horizontal tear line section and in both adjoining vertical tear line sections.

17. The composite layer according to claim 9 wherein at least one of the incisions is disposed in the at least one unconnected section of the default tear line and at least one of the incisions is disposed adjacent to the unconnected section of the default tear line so as to control progress of tearing along the default tear line.

* * * * *